F. OAKLEY.
LOCK NUT.
No. 93,943. Patented Aug. 17, 1869.
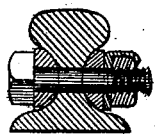
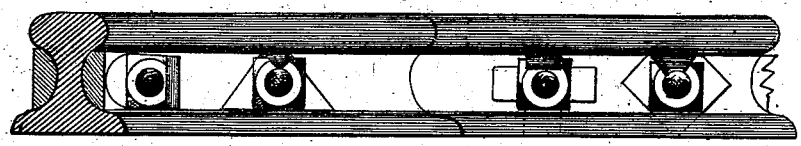
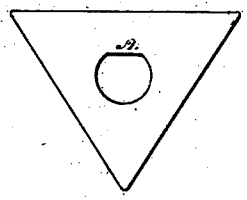
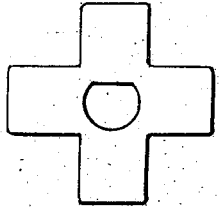
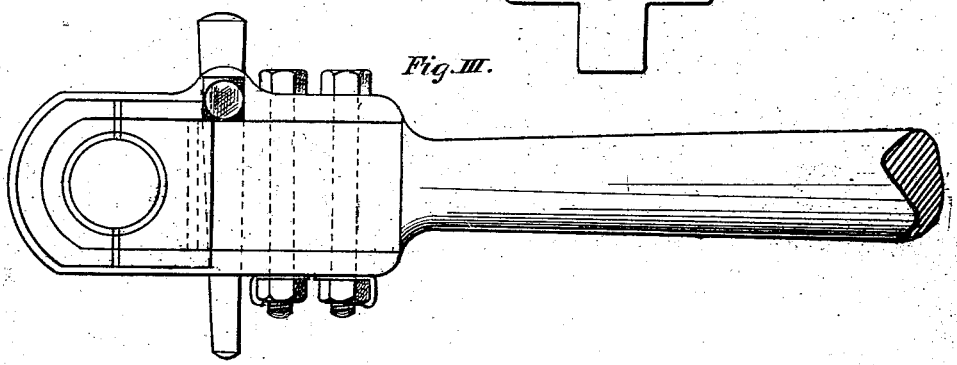
Witnesses—
Donald C. Ridout
T. Kearton Morgan
Frederick Oakley

UNITED STATES PATENT OFFICE.

FREDERICK OAKLEY, OF TORONTO, ONTARIO, CANADA.

IMPROVEMENT IN LOCK-NUTS.

*Specification forming part of Letters Patent No. 93,943, dated August 17, 1869.*

*To all whom it may concern:*

Be it known that I, FREDERICK OAKLEY, of the city of Toronto, in the county of York, in the Province of Ontario and Dominion of Canada, have invented a certain new and useful machine for holding firmly and securely in their place bolt-nuts, to be called or known as "Oakley's Improved Metal-Nut Fastener;" and I do hereby declare that the following is a full, clear, and exact description of the construction and operation of the same, reference being had to the annexed drawings, making a part of this specification.

My device consists in a washer made of iron, copper, tin, zinc, or any other appropriate material, and so constructed that the portion of the washer projecting outside of the nut for which it is to be used forms the improved metal-nut fastener to which my specification refers. The washer should also be made sufficiently thick to prevent it fitting into the thread of the screw.

In the drawings, Figure I is an end view, and Fig. II a side elevation, of a rail; and Fig. III, a side elevation of the butt-end of a connecting rod, the application of my improved metal-nut fastener being distinctly exhibited in each figure. Fig. IV is a plan of the nut-fastener, showing it in a triangular form, with the hole; instead of being round, as it is in ordinary washers, only partially so, the circle being, as it were, broken by a flat, as seen at A.

I do not confine myself to any particular form, the shape being merely a matter of taste or convenience. From a description of it, applied to prevent the immense loss of nuts used for binding the rails together on railroads, the value of the invention may readily be understood in its application to any description of machinery. I take an ordinary fish-plate joint bolt, and, either before or after a thread has been raised upon it, form the body of the bolt to a shape that will fit the hole through the washer, by slightly flattening it, (see Fig. VI,) if a washer similar to that shown in Fig. IV is to be used, and so on, the body of the bolt being formed to fit any shaped hole whatever, so long as it attains the end, which is to prevent the washer from turning on the bolt.

Having prepared the bolt as described, I adjust the fish-plate in the ordinary way, and, pushing bolts through as usual, slip on the washers, which form my improved metal-nut fastener, and, entering the nuts, screw them to the proper degree of tension against the washers. I then take a bar made as a chisel, or any other convenient shape, and with it turn the portion of the washers I mentioned before as projecting outside the nut, against and over the nuts, in such a manner that it is impossible for the nuts to come off or even turn.

From this description it may be seen that my invention entirely removes the necessity for split pins, check or jam nuts, so commonly used in all kinds of machinery, the washer supplying their place much more effectually and at less cost. For instance, as applied to connecting-rods, (see Fig. III,) the washer may be made, like Fig. VIII, with four wings, one being sufficient to hold the nut. When the nut requires to be removed, this wing may be pressed back or cut off. The washer may thus be used four times, a wing being destroyed each time the nut is removed.

What I claim as my invention, and desire to secure by Letters Patent, is—

The combination of the bolt A, flattened on one side, with the washer B, with opening of corresponding shape, constructed substantially as described.

FREDERICK OAKLEY.

Witnesses:
DONALD C. RIDOUT,
T. KEARTON MORGAN.